(12) United States Patent
Krasadakis

(10) Patent No.: US 10,891,436 B2
(45) Date of Patent: Jan. 12, 2021

(54) DEVICE AND METHOD FOR VOICE-DRIVEN IDEATION SESSION MANAGEMENT

(71) Applicant: Accenture Global Solutions Limited, Dublin (IE)

(72) Inventor: Georgios Krasadakis, Dublin (IE)

(73) Assignee: Accenture Global Solutions Limited, Dublin (IE)

( * ) Notice: Subject to any disclaimer, the term of this patent is extended or adjusted under 35 U.S.C. 154(b) by 127 days.

(21) Appl. No.: 15/917,118

(22) Filed: Mar. 9, 2018

(65) Prior Publication Data

US 2019/0279619 A1 Sep. 12, 2019

(51) Int. Cl.
| | |
|---|---|
| *G06F 40/30* | (2020.01) |
| *G06F 16/683* | (2019.01) |
| *G06F 16/635* | (2019.01) |
| *G10L 25/51* | (2013.01) |
| *G10L 15/08* | (2006.01) |
| *G10L 15/18* | (2013.01) |
| *G10L 17/06* | (2013.01) |

(52) U.S. Cl.
CPC ............ *G06F 40/30* (2020.01); *G06F 16/635* (2019.01); *G06F 16/683* (2019.01); *G06F 16/685* (2019.01); *G10L 15/1822* (2013.01); *G10L 17/06* (2013.01); *G10L 25/51* (2013.01); *G10L 2015/088* (2013.01)

(58) Field of Classification Search
CPC ....... G10L 15/20; G10L 25/93; G10L 17/005; G06F 16/683; G06F 16/635; G06F 17/2785

USPC .......................................................... 704/200
See application file for complete search history.

(56) References Cited

U.S. PATENT DOCUMENTS

| | | | | |
|---|---|---|---|---|
| 7,536,713 | B1 * | 5/2009 | Bartholomew | G06F 16/40 726/7 |
| 7,764,771 | B2 * | 7/2010 | Goerg | H04M 11/10 379/88.14 |
| 8,138,930 | B1 * | 3/2012 | Heath | G01W 1/00 340/601 |
| 8,412,530 | B2 * | 4/2013 | Pereg | G06F 40/35 704/270 |
| 8,488,916 | B2 * | 7/2013 | Terman | G09B 5/08 382/315 |
| 9,710,829 | B1 * | 7/2017 | Sitapara | G06Q 30/0276 |
| 9,728,190 | B2 * | 8/2017 | Burton | G10L 15/1822 |

(Continued)

OTHER PUBLICATIONS

"Dragon Mobile Assistant; Simplify your mobile life" Nuance Communications, Inc., 2017, 5 pages.

(Continued)

*Primary Examiner* — Edwin S Leland, III
(74) *Attorney, Agent, or Firm* — Brinks Gilson & Lione

(57) ABSTRACT

An idea recognition tool utilizes natural language processing techniques to capture, understand, and identify ideas that are mentioned by speakers during a conversation involving multiple speakers, and tag ideas attributed to their speaker accordingly. The idea recognition tool also autonomously triggers search operations to obtain supplemental information for enriching the underlying identified ideas. The identified ideas and supplemental information are grouped, classified, and formatted into a dedicated format for further analysis, as well as considered for implementing relevant actions.

16 Claims, 5 Drawing Sheets

(56) References Cited

U.S. PATENT DOCUMENTS

| | | | |
|---|---|---|---|
| 2004/0186738 A1* | 9/2004 | Reisman | G06Q 30/02 705/26.1 |
| 2006/0041428 A1* | 2/2006 | Fritsch | G10L 15/1815 704/257 |
| 2010/0023355 A1* | 1/2010 | Sagalow | G06Q 40/08 705/4 |
| 2010/0299135 A1* | 11/2010 | Fritsch | G06F 40/30 704/9 |
| 2010/0312729 A1* | 12/2010 | Chen | G06N 5/043 706/14 |
| 2011/0131033 A1* | 6/2011 | Ylonen | G06F 40/20 704/9 |
| 2011/0314003 A1* | 12/2011 | Ju | G10L 15/1822 707/723 |
| 2012/0158776 A1* | 6/2012 | Howard | G06F 16/41 707/769 |
| 2012/0166371 A1* | 6/2012 | Sweeney | G06N 7/005 706/14 |
| 2012/0166372 A1* | 6/2012 | Ilyas | G06F 16/84 706/14 |
| 2012/0166373 A1* | 6/2012 | Sweeney | G06N 5/02 706/14 |
| 2012/0321062 A1* | 12/2012 | Fitzsimmons | H04L 65/403 379/142.17 |
| 2013/0262371 A1* | 10/2013 | Nolan | G06Q 30/02 707/603 |
| 2013/0311169 A1* | 11/2013 | Khan | G06F 16/353 704/9 |
| 2014/0075004 A1* | 3/2014 | Van Dusen | G06F 16/90335 709/223 |
| 2015/0066481 A1* | 3/2015 | Terrell | G06F 40/30 704/9 |
| 2015/0286943 A1* | 10/2015 | Wang | G06F 3/04842 706/11 |
| 2015/0348538 A1* | 12/2015 | Donaldson | G10L 17/22 704/235 |
| 2016/0171901 A1* | 6/2016 | Beketayev | G09B 7/02 434/362 |
| 2016/0286049 A1* | 9/2016 | Guo | H04M 3/566 |
| 2017/0032027 A1* | 2/2017 | Mauro | G06F 16/3329 |
| 2017/0161372 A1* | 6/2017 | Fern Ndez | G06F 40/268 |
| 2017/0337261 A1* | 11/2017 | Wang | G06F 40/30 |
| 2019/0236361 A1* | 8/2019 | Fish | G09B 19/00 |
| 2019/0279619 A1* | 9/2019 | Krasadakis | G06F 16/683 |

OTHER PUBLICATIONS

"Is social medial targeting ads based on our conversations?" Terra Ferma media, Sep. 28, 2017, https://www.terrafermamedia.com/social-media-ads-conversations/, 6 pages.

Ronny Melz et al., "Mapping speech streams to conceptual structures", Archives of Control Sciences, vol. 15(LI), 2005, No. 3, pp. 351-362.

* cited by examiner

500

| Identified Participant(s) | Identified Idea(s) | Obtained Supplemental Information |
|---|---|---|
| Recognized Team:<br>• Smart Building Automation Team<br><br>Business Unit:<br>• Automation | Meeting Date:<br>• April 2, 2017<br><br>Meeting Run Time:<br>• 2:00 pm Eastern – 2:46 pm Eastern | Meeting Location:<br>• Building C, room 320 |
| Participant 1<br>• Employee profile information for Participant 1 | Idea 1: Internet of Things | • IoT website<br>• Employee 321 has previously worked on IoT project (Invite Employee 321) |
| | Idea 2: RF sensors | • whitepaperRFsensors.doc<br>• Dr. Smith is a known expert in RF sensors (email: drsmith@email.com) |
| Participant 2<br>• Employee profile information for Participant 2 | Idea 1: Artificial Intelligence | • AI tutorial video |
| | Idea 2: Machine Learning | • Machine Learning wiki |
| | Idea 3: Automation | • Employee 312 has worked on AI, Machine Learning, and Automation projects (Invite Employee 312) |

Figure 5

DEVICE AND METHOD FOR VOICE-DRIVEN IDEATION SESSION MANAGEMENT

TECHNICAL FIELD

This disclosure relates to a smart audio device including a microphone. The smart audio device monitors conversations taking place within a space amongst one or more persons, analyzes the conversation by applying natural language processing (NLP) techniques, recognizes ideas discussed during the conversation, and submits the ideas to an idea management system. The NLP techniques are applied in the context of ideation, innovation, product development, thus utilizing the appropriate ontologies, dictionaries, and integrated systems. After the ideas are recognized, the smart audio device also implements various smart processes such as searching for supplemental information related to the recognized ideas, recommending experts to participate in the session, and grouping, indexing, and formatting information obtained during the session to satisfy requirements for submission to the idea management system.

BACKGROUND

Smart audio devices placed within a space operate to pick up words spoken by people within a range of a microphone installed on the smart audio device. By analyzing the spoken words (e.g., NLP) to interpret the topics discussed in the conversations, a smart audio device may control further operations based on specific words or phrases and patterns that are recognized. Utilizing the available smart functionality of smart audio devices may open up new advantages within an enterprise setting. In particular, the advantages offered by smart audio devices may be further enhanced within a smart building that includes an installed network of sensors, information capturing devices (e.g., video cameras), and computing resources for operating building systems in a more efficient manner by automating certain tasks based on information obtained by the sensors and the smart audio device.

Strategies for taking advantage of the available features in a smart audio device, in possible combination with one or more additional information obtaining sensors, are disclosed for advancing efficiency and productivity of enterprise resources.

BRIEF DESCRIPTION OF THE DRAWINGS

FIG. 5 shows an exemplary table of information identified from a recorded conversation by the idea recognition tool.

DETAILED DESCRIPTION

Figure 1:
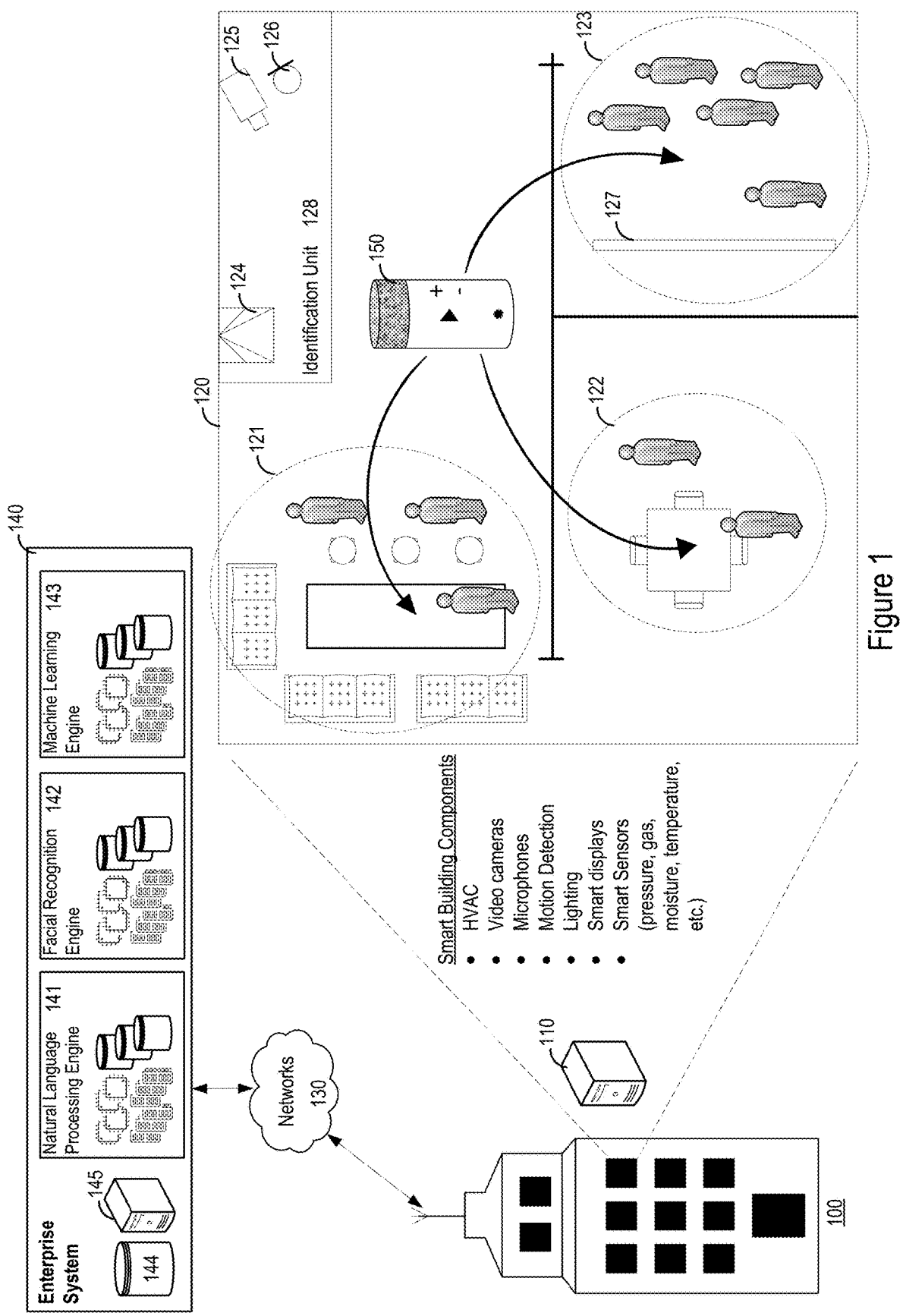
FIG. 1 shows an exemplary system setting for utilizing a smart audio device.

Apparatuses, systems, and methods are described that take advantage of the benefits offered by a smart audio device to enable seamless identification of ideas that are discussed during a meeting session involving one or more speakers gathered within a space. The smart audio device works in conjunction with an idea recognition tool, as well as components of a smart building according to some embodiments, to record conversations, identify ideas that are discussed within the conversation, implement relevant actions based on the identified ideas, and upload the ideas to an idea management system for further consideration.

The idea recognition tool ("IR tool") described herein may be running, at least in part, on computing circuitry included on the smart audio device, a building server that is part of the building local area network (LAN) that also includes the smart audio device, and/or a server computer included in an enterprise system that is in communication with the smart audio device through a network connection (e.g., the Internet). The IR tool may be comprised of software, hardware, and/or circuitry for implementing the features described herein. The IR tool utilizes media components (e.g., speakers, microphones) installed on the smart audio device, as well as components of a smart building installed throughout a smart building environment according to some embodiments (e.g., picture/video cameras, sensors), to detect conversations taking place within a specific area (e.g., meeting room, conference room, open space, or other defined area), identify ideas that are discussed within the conversations, and implement relevant actions based on the ideas that are identified.

The IR tool may detect an idea brainstorming session is occurring based on access to employee calendars that include date, time, event name, and location information for such meetings, and activate the recording and idea identification features of a smart audio device in the vicinity of the meeting location. When the employee calendar is available to obtain the upcoming meeting information, the IR tool may activate the recording and idea identification features within the appropriate context of the scheduled idea brainstorming session. To set up the appropriate context, the IR tool may load the appropriate dictionaries (e.g., for a particular class of products to be discussed in the specific scheduled idea brainstorming session) for NLP techniques to reference, load the appropriate profiles corresponding to the participants included in the calendar's meeting information, load the appropriate profiles corresponding to participants that are not included in the list of participants included in the calendar's meeting information but could or should have been invited, load appropriate market and competition intelligence from public domain sources that relate to the scheduled idea brainstorming session, or other relevant information that is available to set the context.

In addition or alternatively, the IR tool may be activated on a smart audio device located within a space based on an "always-on" microphone installed on the smart audio device analyzing conversations and recognizing key phrases and/or words known to relate to idea brainstorming sessions.

In addition to identifying ideas spoken during conversations, the IR tool also identifies the speaker of the ideas, such as an employee or other participant to the meeting. For example, a recorded voice clip from the conversations may be compared against reference voice samples that are included in an employee profile stored within an employee profile database. The recorded voice clip may be a real-time is recorded as the speaker is speaking, or may be a delayed recording that lags real-time speaking by a predetermined length of time. The reference voice samples may also be obtained from sources other than an employee profile, such as a previously recorded conversation of the speaker stored on a historical database. When a match between the recorded voice clip and a reference voice sample is made (e.g., within a predetermined similarity threshold), the IR tool recognizes the speaker from the recorded voice clip to be the employee associated with the employee profile including the matched reference voice sample. In addition or alternatively, facial recognition may be applied to a video or image recording of the speaker captured by a camera to recognize the speaker.

Once the speaker is identified, each idea recognized from the conversations may be tagged to the identified speaker. Although reference is made to an employee throughout this disclosure, the employee may be representative of any person known, and/or identifiable, by an entity and having a user profile. For example, a known user may include a contractor hired to be part of a project team to accomplish a specific project. The known user may also include a client agent to an enterprise organization, where the client agent is included on a project team to supervise and observe other employee project team members.

An enterprise may include various predetermined groupings of people within its organization structure. For example, employees may be profiled into specific fixed teams according to their work function (e.g., accounting fixed team, human resources fixed team, finance fixed team, legal fixed team). Whereas the fixed team attribute is a long-term team, an employee may further be grouped into shorter term project teams. Project teams are comprised of a specific team of employees tasked with completing a specific project task for the enterprise. An employee may be included on one or more project teams at the same time.

After being activated in view of the brainstorming session meeting event, the IR tool may implement various relevant actions. For example, the IR tool may identify ideas from the on-going conversations, and conduct searches for supplemental information as a background process. So if an idea in the field of the Internet-of-Things is identified by the IR tool from the on-going conversations, the IR tool may conduct a search on the Internet-of-Things on the Internet, organize, group, and present the search results through the smart audio device, other multi-media device within the space where the meeting is taking place, or pushed as an electronic message (e.g., email) to one or more participants detected in the meeting. The IR tool may further search for, and identify, an expert in the field of the identified idea that may not be currently participating in the conversation. Once identified, a recommendation for inviting the expert may be presented to the participants, and/or a meeting invite may be electronically transmitted to the expert for joining the meeting (e.g., via email or link to join a video/audio conference line). The expert's availability may also be taken into consideration for the right action. For example, if the non-participating expert is found to be online and available, this could trigger an instant suggestion to the team and/or a message being transmitted to the non-participating expert. If busy and not available, an email could be sent instead.

To enhance efficiency and productivity of these meetings, the IR tool uploads information gathered during the idea brainstorming session to an idea management system. The information obtained by the IR tool and uploaded to the idea submission portal may be obtained by the IR tool to meet predetermined requirements to generate a format for filling out entries of a session summary report. These technological improvements relate to the application of NLP techniques to identify ideas from recorded conversations, implementing relevant actions based on the identified ideas, and submitting the obtained information to an idea management system for the generation of a session summary report following a predetermined format of information. In this way, the IR tool and smart audio device improves the computer capabilities of the devices involved to more efficiently (e.g., improved speed, data handling, and resource utilization, better information flow, faster and more informed decisions on how to act on ideas, less or no interaction required) gather information from a spoken conversation involving an idea brainstorming session, and supporting this meeting by presenting supplemental information to the group and organizing the topics discussed during the meeting by generating the session summary report.

FIG. 1 illustrates an exemplary building 100, which may be a smart building, including an area represented by a floor layout 120 that includes various groups of employees gathered in different areas (e.g., different rooms on the floor). For example, a first group 121 gathered in a first space includes three people, a second group 122 gathered in a second space includes two people, and a third group 123 gathered in a third space includes five people standing in front of a smart display 127. A smart audio device 150 is located at various locations of the building 100 floor layout 120 to pick up conversations between the people gathered. The IR tool may be running, at least in part, on the smart audio device 150. The smart audio device 150 includes computing circuitry, software, and hardware for implementing the features of the IR tool described herein. The smart audio device 150 also includes at least a speaker for presenting audible information and a microphone for receiving audible sounds, as well as an input control interface for receiving user commands. The user commands may include, for example, predefined voice commands that are set to control predefined trigger events.

The building 100 may also include a plurality of smart building components such as HVAC (heating, ventilation, and air-conditioning) systems that are controlled based on feedback obtained from various smart sensors installed in the building 100. The building 100 may also include video cameras 125 for capturing (e.g., recording and/or real-time streaming) occurrences within the building 100. Image recognition processes may be applied to the recorded video images to interpret information about the occurrences that are depicted in the recorded video images (e.g., facial recognition of speakers). The building 100 may also include microphones 126 for capturing (e.g., recording and/or real-time streaming) sounds occurring in the building 100. According to some embodiments, the microphones 126 may be representative of the smart audio device 150. Speech recognition processes (e.g., natural language processing) may be applied to the audio conversations captured by the microphones 126 to identify keywords, as well as identify a speaker of the keywords in the conversations. The building 100 may also include motion detectors 124 for detecting movement and controlling systems within the building 100 (e.g., HVAC temperature settings) based on detected movement. The building 100 may also include various smart sensors for measuring characteristics within the building 100. The measured characteristics from the smart sensors are referenced to control various systems within the building 100 to operate the building 100 more efficiently. The building 100 may also include lighting controls that are controlled based on, for example, detected sensor measurements to be more efficient. The building 100 may also include a network of smart displays, such as smart display 127, located at different locations that display content presented by the IR tool.

The floor layout 120 illustrated in FIG. 1 shows an identification unit 128 that includes the motion detector 124, the video camera 125, and the microphone 126. The motion detector 124 may be an optical, microwave, or acoustic based sensor for detection movement within the floor layout 120. The video camera 125 captures digital video of the room layout. The video camera 125 may also include depth/distance measuring components for measuring a distance between objects and/or mapping a three-dimensional image. The microphone 126 captures sounds within the different areas in the floor layout 120. Based on information obtained from the smart audio device 150 alone, or in combination with information obtained by the identification unit 128, the IR tool determines when an idea brainstorming session is occurring, identifies ideas discussed during idea brainstorming session, identifies speakers from the idea brainstorming session, and implements the relevant actions described herein. For example, the information obtained by the smart audio device may be analyzed against known patterns from other brainstorming sessions (key phrases, keywords, discussion flow patterns) and against relevant content and dictionaries.

The building 100 also includes a central command computer 110 for running, at least a part, of the IR tool to help accomplish features of the IR tool described herein. The central command computer 110 may be a representation of one or more computer devices located within the building 100 that comprise a LAN along with the other smart devices and smart components of the building 100. For example, when the smart audio device 150 is a standalone device, the smart audio device 150 may communicate with the central command computer 110 to obtain information gathered by the other smart devices and smart components of the building 100.

The central command computer 110, and/or the smart audio device 150, may further communicate with other resources such as an enterprise system 140 through a network 130. The enterprise system 140 may include content management systems, project repository system, human resources systems, building management systems, other known systems that are included within an enterprise operation such as databases 144 for storing enterprise data and enterprise server computers 145. The enterprise system 140 may also include an NLP engine 141, a facial recognition engine 142, and a machine learning (ML) engine 143. According to some embodiments, some, or all, of the NLP engine 141, the facial recognition engine 142, and/or the ML engine 143 may be part of the central command computer 110 and/or smart audio device 150. The network 130 may be representative of one or more private, and/or public, networks defined over any pre-determined and possibly dynamic internet protocol (IP) address ranges.

The NLP engine 141 includes the software, hardware, data storage, and circuitry for implementing the features attributed to the NLP engine 141 described herein. The NLP engine 141 includes dictionaries of terms that are relevant to specific ideas, where a particular dictionary may be referenced based on an idea identified from conversations to setup a context for further natural language processing by the NLP engine 141 on the conversation. For example, when the identified idea relates to artificial intelligence (AI), the NLP engine 141 may reference a dictionary including terms known to be used within the field of AI to setup the context for further natural language processing on the on-going conversation related to AI.

Similarly, the facial recognition engine 142 includes the software, hardware, data storage, and circuitry for implementing the features attributed to the facial recognition engine 142 described herein. Similarly, the ML engine 143 includes the software, hardware, data storage, and circuitry for implementing the features attributed to the ML engine 143 described herein.

Figure 2:
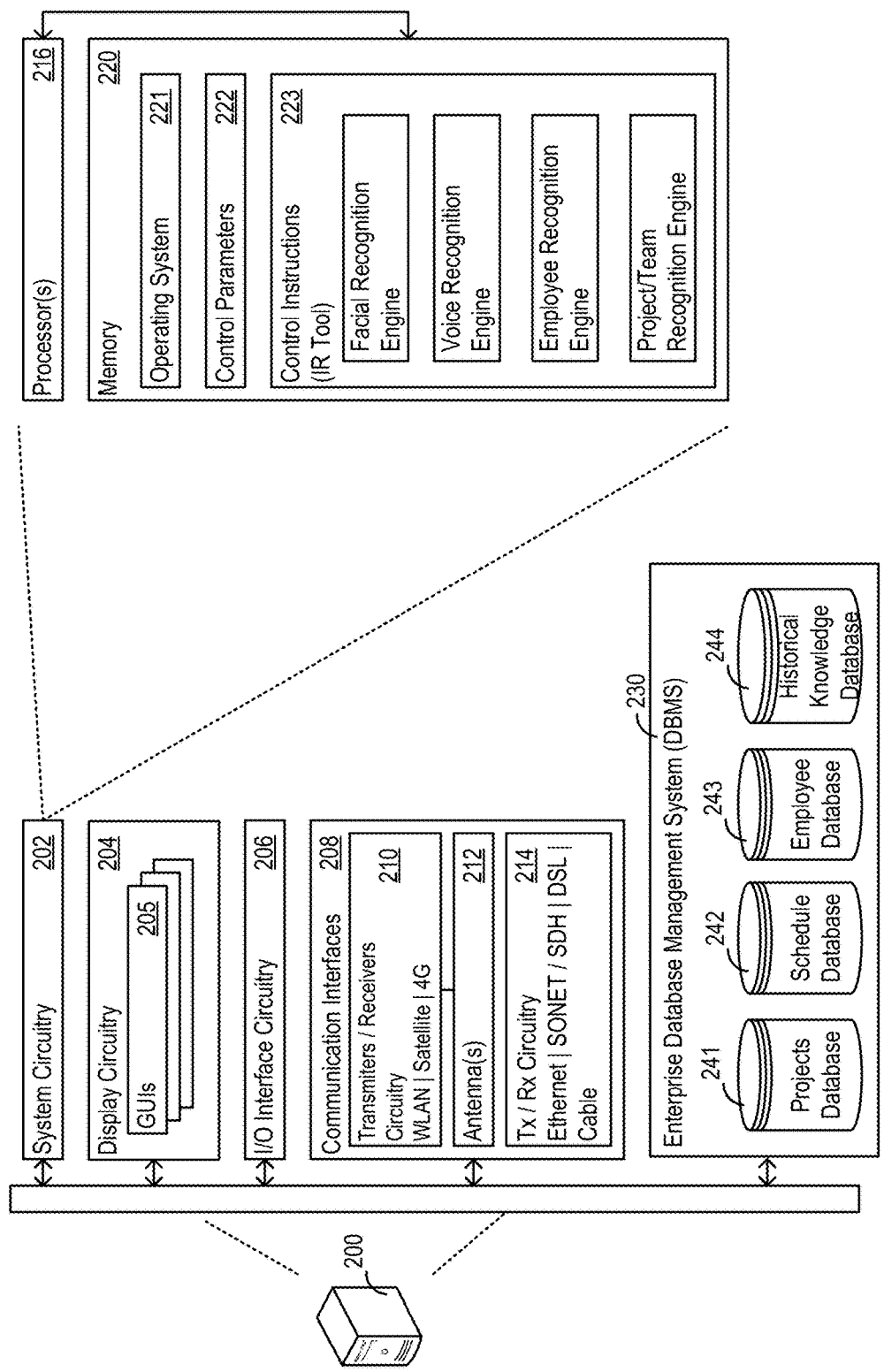
FIG. 2 shows an exemplary computer architecture for a computer device configured to run an idea recognition tool.

FIG. 2 illustrates an exemplary computer architecture 200 for a computing device such as any one of the smart audio device 150, the central command computer 110, or the server computers 145 on which the IR tool is executed. The computer architecture 200 includes system circuitry 202, display circuitry 204, input/output (I/O) interface circuitry 206, and communication interfaces 208. The graphical user interfaces (GUIs) 205 displayed by the display circuitry 204 may be representative of GUIs generated by the IR tool. The GUIs may be displayed locally using the display circuitry 204, or for remote visualization, e.g., as HTML, JavaScript, audio, and video output for a web browser running on a local or remote machine such as the smart display 127. Among other interface features, the GUIs 205 may render displays of ideas that are identified by the IR tool from participant voice patterns, any supplemental information obtained by the IR tool, as well as a session summary report generated from by the IR tool, as described further herein.

The GUIs 205 and the I/O interface circuitry 206 may include touch sensitive displays, voice or facial recognition inputs, buttons, switches, speakers and other user interface elements. Additional examples of the I/O interface circuitry 206 includes microphones, video and still image cameras, headset and microphone input/output jacks, Universal Serial Bus (USB) connectors, memory card slots, and other types of inputs. The I/O interface circuitry 206 may further include magnetic or optical media interfaces (e.g., a CDROM or DVD drive), serial and parallel bus interfaces, and keyboard and mouse interfaces.

The communication interfaces 208 may include wireless transmitters and receivers ("transceivers") 210 and any antennas 212 used by the circuitry of the transceivers 210. The transceivers 210 and antennas 212 may support WiFi network communications, for instance, under any version of IEEE 802.11, e.g., 802.11n or 802.11ac, or other wireless protocols such as Bluetooth, Wi-Fi, WLAN, cellular (4G, LTE/A). The communication interfaces 208 may also include serial interfaces, such as universal serial bus (USB), serial ATA, IEEE 1394, lighting port, $I^2C$, slimBus, or other serial interfaces. The communication interfaces 208 may also include wireline transceivers 214 to support wired communication protocols. The wireline transceivers 214 may provide physical layer interfaces for any of a wide range of communication protocols, such as any type of Ethernet, Gigabit Ethernet, optical networking protocols, data over cable service interface specification (DOCSIS), digital subscriber line (DSL), Synchronous Optical Network (SONET), or other protocol. The communication interfaces 208 may communicate with remote computing devices via a network, such as the network 130.

The computer architecture 200 also includes, or in other embodiments communicates with, an enterprise database management system (enterprise DBMS) 230. The enterprise DBMS 230 may be included as part of the enterprise system 140 illustrated in FIG. 1. The DBMS 230 may be one or more of a Relational DBMS, a Document store, a NoSQL, a Graph DB, or a combination thereof. The enterprise DBMS includes a projects database 241 storing project profiles describing attributes of active, and in some embodiments also historical, enterprise projects that have been assigned to specific project teams of employees. Each project profile may include project attribute information including one or more of the following: project name, project description, critical dates, current status/state, meeting history, project sponsors, project manager(s), project team members, project team synthesis, as well as other project descriptive information. Each project profile may also include a topic signature for the projects, where the topic signature includes a storage of historical communications related to the project (e.g., emails related to the project, attachment documents to electronic correspondences related to the project, documents related to the project). The information included in the project profile (e.g., the topic signature alone or with other information in the project profile) may be utilized as a type of domain or dictionary of terms and documents that may later be referenced when analyzing a current project team meeting or a relevant to the project brainstorming or ideation session in the building 100.

The enterprise DBMS 230 also includes a schedule database 242 that stores the schedules for enterprise employees. The employee schedule information may be obtained from employee's personal calendars that are stored within the schedule database 242, as well as scheduling information such as paid time off and sick leave information obtained from human resources. The enterprise DBMS 230 also includes an employee database 243 that stores employee profiles describing employee attributes. The employee attributes may include an employee's reference photograph for facial recognition comparison purposes, as well as an employee's reference voice file for voice recognition comparison purposes. The employee profiles may also include an employee's detailed skills, experiences, interests, current and previous roles, educational and training backgrounds, prior participation in projects and roles in prior projects. The employee profile information may be referenced to determine a "missing experts" not present in the presently occurring idea brainstorming session, and make recommendations to the brainstorming team, as disclosed herein.

The enterprise DBMS 230 also includes a historical knowledge database 244 that stores performance information from iterations of the IR tool that may be referenced during subsequent iterations of the IR tool to improve a performance of the IR tool. Performance of the IR tool may be taken by direct feedback from idea brainstorming session participants that review a resulting session summary report that is generated by the IR tool, and submit feedback scores on the quality of the session summary report. The feedback scores may provide a higher score when a participant finds more accurate idea recognition and gathering of more relevant supplemental information to the ideas discussed by the participant; conversely the feedback scores may provide a lower score when a participant finds less accurate idea recognition and gathering of less relevant supplemental information to the ideas discussed by the participant. The performance of the IR tool may further be taken in view of whether an idea included in the resulting session summary report is selected for further purposes (e.g., idea is selected for a new product being developed, or selected for a patent application filing).

The system circuitry 202 may be representative of any combination of hardware, software, firmware, application programming interface, or other circuitry for implementing the features of the IR tool described herein. For example, the system circuitry 202 may be implemented with one or more systems on a chip (SoC), application specific integrated circuits (ASIC), microprocessors, discrete analog and digital circuits, and other circuitry. The system circuitry 202 may implement any desired functionality of the IR tool. As just one example, the system circuitry 202 may include one or more instruction processor 216 and memory 220.

The memory 220 stores, for example, control instructions 223 for executing the features of the PTI tool, as well as an operating system 221. In one implementation, the processor 216 executes the control instructions 223 and the operating system 221 to carry out any desired functionality for the IR tool. For example, the control instructions 223 for the IR tool includes a facial recognition engine, a voice recognition engine, an employee recognition engine, and a project/team recognition engine. Each component of the control instructions 223 may include the instructional logic for implementing the associated features of the IR tool. The memory 220 also includes control parameters 222 that provide and specify configuration and operating options for the control instructions 223, operating system 221, and other functionality of the computer architecture 200.

Figure 3:
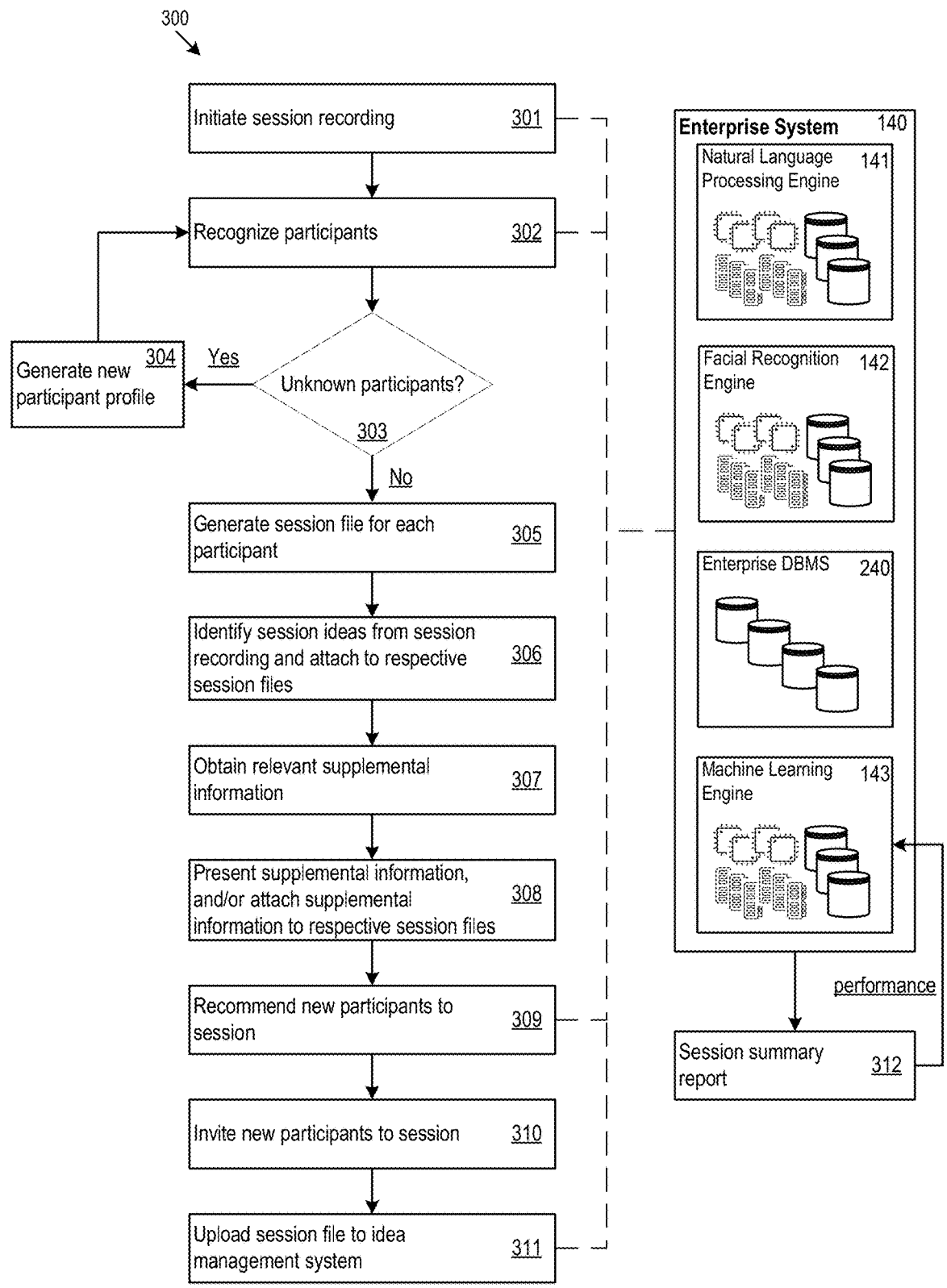
FIG. 3 shows an exemplary flow diagram of logic describing a process for identifying an idea discussed during a session.

FIG. 3 illustrates a flow diagram 300 of logic describing a process implemented by the IR tool for identifying an idea from a conversation recorded from an idea brainstorming session. Exemplary embodiments will be described with reference to the exemplary system setting shown in FIG. 1.

The IR tool initiates a session recording based on a triggering event (301). For example, the triggering event may be the detection of a conversation by the smart audio device 150, analyzing the conversation, and determining the conversation relates to an idea brainstorming session. To determine the conversation relates to the idea brainstorming session, the IR tool applies NLP strategies including any one or more of parsing sentences included in the conversation recording into a phrase structure, tagging keyword topics related to an idea brainstorming session included in the phrase structure, determining a sentiment of the sentence, summarizing the sentence, and determining whether the sentence relates to an idea brainstorming session accordingly. The IR tool utilizes the NLP engine 141 to apply the NLP strategies for determining the conversation relates to the idea brainstorming session.

After determining the on-going conversation relates to the idea brainstorming session, the IR tool then recognizes individual participants from the conversation (302). To recognize the individual participants, the IR tool isolates a participant speaker's voice from the conversation, and compares the speaker's voice against reference voice files from employee profiles stored on the enterprise DBMS 240. To further increase accuracy, the IR tool may utilize the NLP engine 141 to compare speaking patterns from the speaker's voice against the reference voice files from the employee profiles. When cameras are available to the smart audio device 150, accuracy of recognizing the participants may be increased by further combining facial recognition. For example, the IR tool may utilize the facial recognition engine 142 to compare a captured image of the speaker to a reference profile picture of an employee considered to be the speaker. Matching both the speaker's voice and facial image to the reference voice file and reference profile picture of an employee's profile further increases the accuracy of recognizing the correct identity of the participant. According to some embodiments, a third signal could be referenced based on the known location of the participant in the building 100 (e.g., by tracking a smart badge worn by an employee, an installed corporate mobile app on the employee's smartphone, beacons, radio frequency identification sensors (RFID), or other tracking technology).

When the speaker's voice cannot be matched to an employee's reference voice file (303), the IR tool generates a new participant profile for the speaker (304). Any ideas that are identified and attributed to the speaker will be tagged to the new participant profile. In such case, the speaker's voice and facial image may be stored in the new participant profile as a reference voice sample and reference profile picture, respectively. Subsequent data tracked to the speaker may be stored into the new participant's profile created here.

After detecting the participants, the IR tool generates a session file for each of the participants that are recognized (305). An exemplary session file 500 is illustrated in FIG. 5. The session file identifies description attributes for the session, attributes identified ideas to their speaker, and tags supplemental information in the form of metadata to each of the identified ideas.

Throughout the on-going session recording that records the conversation amongst the session participants, the IR tool continues to identify ideas from the conversations (306). To identify the ideas from the conversations included in the session recording, the IR tool applies NLP strategies including any one or more of parsing sentences included in the conversation recording into a phrase structure, tagging keyword topics related to ideas included in the phrase structure, determining a sentiment of the sentence, summarizing the sentence, and determining whether the sentence relates to an idea brought up during an idea brainstorming session accordingly. The IR tool utilizes the NLP engine 141 to apply the NLP strategies for identifying ideas brought up by participants during the conversations in the session recording. Each idea that is identified from the session recording is attached to, or associated with, their respective speaker. For example, the session file 500 shows that participant 1 is attributed with bringing up two ideas: 1) ideas related to the Internet of Things, and 2) ideas related to radio frequency (RF) sensors. The IR tool may further apply sentiment analysis to the speaker to identify whether an individual speaker was for or against a particular idea. This information may further be stored in the speaker's session file.

As part of the identification of the ideas, the IR tool may track the idea brainstorming session as it progresses through various stages of an idea. For example, the IR tool may identify the beginning (e.g., first mention) of an idea, track the different embodiments of the idea that are discussed through various iterations of the idea, and end with an identification of a final idea summary. For the session file, the IR tool may tag each stage of the idea accordingly. The session file may further tag each identified idea with a time, and/or stage, at which the idea was discussed during the idea brainstorming session.

Throughout the on-going session recording that records the conversation amongst the session participants, the IR tool also works to obtain relevant supplemental information to the identified ideas (307). For example, the IR tool may operate to search the Internet for relevant websites (e.g., session file 500 includes a link to an IoT website as supplemental information to the IoT idea) or relevant multimedia (e.g., session file 500 includes a link to an AI tutorial video as supplemental information to the Artificial Intelligence (AI) idea). The IR tool may also parse the enterprise DBMS 240 for existing work documents related to the identified idea (e.g., session file 500 includes an existing white paper on RF sensors as supplemental information to the RF sensors idea), as well as recommendations to fellow employees that have worked on projects within the field of the idea (e.g., session file 500 includes a recommendation for Employee 321 that has previously worked on an IoT project). The IR tool may also search the Internet to identify an expert within the field of the identified idea (e.g., session file 500 includes a recommendation to Dr. Smith who is found to be an expert in RF sensors). Other types of supplemental information relevant to the identified ideas may also be obtained. The background search feature may be implemented by the IR tool autonomously, or on demand in response to a user input command (e.g., voice command). The search operation could happen seamlessly, by the IR tool, which then decides whether a search result has a high enough probability of relevance to an idea being discussed for communicating to the team. The probability of relevance may be a predetermined relevance threshold. When the search results do not exceed the predetermined relevance threshold, the IR tool does not present to the team. The search results may be presented (e.g., verbal output, display on a display within the vicinity of the team, or both). In either case, the search results may still be stored for inclusion in a later prepared session summary report.

The IR tool presents the supplemental information to the group and/or attaches the supplemental information to the respective session files (308). For example, any one or more of the supplemental information included in the session file 500 may be presented to the group of participants meeting in the idea brainstorming session via audible output through the smart audio device 150 or visual output through the smart display 127. The supplemental information is attached to the corresponding participant and idea in the session file, as exemplified by session file 500.

When appropriate, the IR tool recommends new participants to the on-going idea brainstorming session (309). The recommended participants may be absent members of the team currently meeting. For example, if the IR tool determines that a Smart Building Automation Team is currently meeting, and that of the three members that comprise the Smart Building Automation Team two are present while one member is missing, the IR tool may recommend inviting the missing member. In another example, the IR tool may recommend inviting an employee that has been determined to be an expert or having worked previously on a project within the field of the identified idea.

After presenting the new participant recommendation, the IR tool may present options for transmitting the invitation to the recommended participant (310). For example, the IR tool may display a link for sending an email invitation, or other electronic message such as an inter-office messenger message, to the recommended participant. Any one of the processes that are represented by (306)-(310) may be repeated for each instance a separate idea is discussed.

The session file including the identified ideas and supplemental information are then uploaded to an idea management system (311). The idea management system may be part of the IR tool, where the idea management system analyzes the session file to extract information for filling out a predetermined session summary report. After filling out the data entry fields of the session summary report, the idea management system outputs the session summary report (312). The session summary report may be an invention disclosure form that previously would have been manually filled out by the team members following their idea brainstorming session. However, with the IR tool's smart assistance, the invention disclosure form may be filled out with the information discussed during the conversations that took place during the idea brainstorming session, as well as supplemental information obtained by the IR tool. The IR tool may further include meeting details such as the meeting location, participants, meeting time, into the session file that may be needed to fill out the invention disclosure form. Session file 500 shows such meeting details obtained by the IR tool. The session summary report may also be one or more of project scope definitions, product feature descriptions, plain idea descriptors, research requests, or other similar type of report having data fields that may be filled in with information discussed during the meeting.

Following the output of the session summary report, the team members may provide their performance scores critiquing the information obtained by the IR tool. The performance scores may further be generated based on an analysis of edits, or other changes, that are made to the session summary report. Each modification to the session summary report may be recognized as a critique that may be improved upon in subsequent generations of a session summary report. The performance scores may be sent back to the ML engine 143 in a feedback loop to improve future performance of the IR tool in identifying ideas discussed during conversations, as well as obtaining relevant supplemental information. The ML engine 143 may further enrich the underlying dictionaries that are referenced during the NLP, as well as any rule sets that are reference during the NLP, and may re-train the NLP models accordingly.

The performance scores may also include results on whether the ideas included in the session summary report were later acted upon. For example, a positive action resulting from an identified idea may be the filing of a patent application or implementation of a feature in an upcoming new product. Positive action results may be included as part of the performance score, as well as feedback on characteristics of the session summary report that positively affected the positive action.

Figure 4:
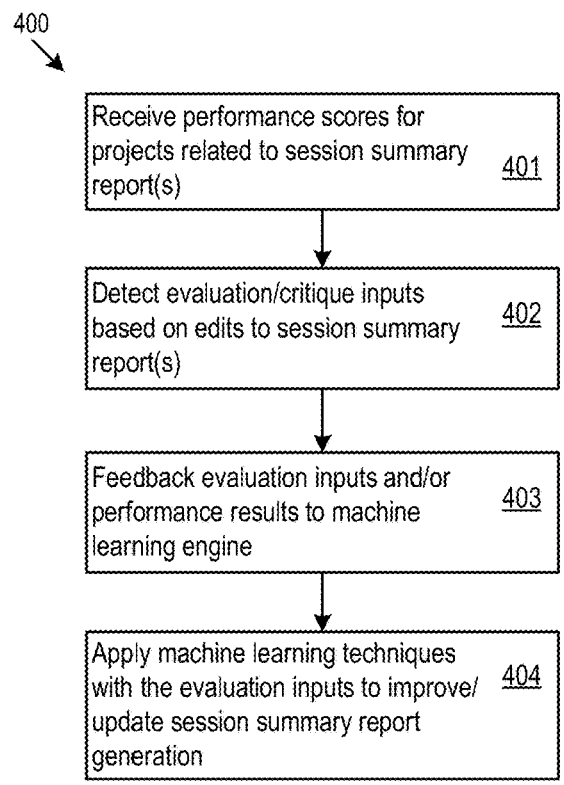
FIG. 4 shows an exemplary flow diagram of logic describing a process for feeding back evaluation and performance data to the idea recognition tool.

FIG. 4 illustrates a flow diagram 300 of logic describing a feedback loop process for improving the performance of the IR tool. Exemplary embodiments will be described with reference to the exemplary system setting shown in FIG. 1.

The IR tool receives performance scores for projects related to ideas included in session summary reports (401). The received performance scores may be scores, comments, and/or critiques provided directly from users such as the speakers themselves, or other user responsible for reviewing the session summary report (e.g., project team manager).

The IR tool also detects evaluations and/or critiques from edits to the session summary reports themselves (402). The edits may be any modifications made to the session summary report. For example, users may review and perform edits on the automatically generated session summary report such as renaming, regrouping, re-classifying, enriching, deleting, or other modification to the information included in the session summary report. The edits, along with the history of edits, by each participant is analyzed and quantified (i.e. what is the percentage of entities misclassified in this report?). The IR tool may analyze each of these edits to the session summary report and convert them into session performance scores.

Each part of the performance scores are further sent to the ML engine 143 as a feedback for analysis under known machine learning techniques (403).

The ML engine 143 applies the known machine learning techniques to improve and/or update future session summary report generation (404). For example, the ML engine 143 may instruct the IR tool on updated strategies that improve the identification of relevant ideas from a conversation based on the received evaluation inputs in the performance score. The ML engine 143 may also instruct the IR tool on updated strategies that improve the identification of relevant supplemental information based on the received evaluation inputs in the performance score.

The identification of edits to the session summary reports are post-processed by the ML engine 143 to identify the poor-performing areas, and make recommendations to an operator of the smart audio device 150 running the IR tool. For example, the IR tool may try to figure out which of the "missed" participants to the idea brainstorming session, were in fact mentioned in the meeting, and could have been captured if only a better configuration or training set was available. The ML engine 143 also enriches the underlying dictionaries and rules set that are referenced during the NLP, and may re-train the NLP models accordingly.

Various implementations have been specifically described. However, other implementations that include a fewer, or greater, number of features for each of the apparatuses, methods, or other embodiments described herein are also possible.

What is claimed is:

1. A computing device comprising:
   microphone circuitry configured to capture a voice discussion of a new innovation including session ideas and to generate a digital audio file; and
   identification circuitry configured to:
   identify the session ideas by using natural language processing to:
      parse a sentence included in the digital audio file into a phrase structure;
      tag keyword topics included in the phrase structure;
      determine a sentiment of the phrase structure;
      summarize the phrase structure;
      identify the session ideas from the summarized phrase structure; and
      select a dictionary related to the identified session ideas for further natural language processing of the digital audio file;
   identify multiple parts of the digital audio file, each part of the digital audio file relating to a step of the innovation;
   flag each part of the digital audio file as relating to a step of the innovation;
   arrange the order of the flagged parts of the digital audio file to correspond to the sequential order of the steps of the innovation;
   identify the semantic content of each part of the digital audio file; and
   store the identified semantic content in an innovation storage platform.

2. The computing device of claim 1, wherein the voice discussion comprises voice signals from a plurality of users.

3. The computing device of claim 1, wherein the identification circuitry is configured to determine, from the digital audio file, one of a title of the innovation, a summary of the innovation, a description of the innovation, or a combination thereof.

4. The computing device of claim 1, further comprising conversation identification circuitry configured to identify one or more parts of the digital audio file, each part of the digital audio file relating to a separate conversation between a different combination of speakers.

5. The computing device of claim 1, further comprising a network interface configured to communicate with a user database; and
   wherein the identification circuitry is further configured to:
      determine a participant voice corresponding to a speaker from the digital audio file;
      compare the participant voice with user profiles included in the user database;
      select, from the user profiles, a selected user profile that corresponds to a user and includes a voice profile matching the participant voice;

identify the session ideas attributed to the participant voice; and tag the session ideas to the speaker.

6. The computing device of claim 5, further comprising session file generation circuitry configured to:
   generate a session file to include the session ideas tagged to the speaker;
   obtain, from an external source, supporting information to the session ideas;
   include, as metadata to the session file, both the session ideas and the supporting information;
   upload the session file to a server portal;
   receive, from the server portal, a session summary report; and
   present the session summary report.

7. The computing device of claim 6, wherein the session file generation obtains the supporting information by being configured to:
   search the external source for the supporting information while the microphone circuitry records the digital audio file.

8. The computing device of claim 6, wherein the session file generation circuitry is further configured to generate an invention disclosure form by selecting steps of the innovation, identified ideas, participants, and supporting information, and filling the information in the invention disclosure form.

9. The computing device of claim 5, wherein the identification circuity is further configured to use natural language processing to determine a speaking pattern of the participant voice and compare the speaking pattern to a stored speaking pattern in the participant's voice profile.

10. A computer implemented method for idea session recording, the method comprising:
    capturing on microphone circuitry a voice discussion of a new innovation and session ideas;
    generating a digital audio file of the voice discussion;
    identifying with identification circuitry the session ideas by using natural language processing to:
      parse a sentence included in the digital audio file into a phrase structure;
      tag keyword topics included in the phrase structure;
      determine a sentiment of the phrase structure;
      summarize the phrase structure;
      identify the session ideas from the summarized phrase structure; and
      select a dictionary related to the identified session ideas for further natural language processing of the digital audio file;
    identifying with the identification circuitry multiple parts of the digital audio file, each part of the digital audio file relating to a step of the innovation;
    flagging each part of the digital audio file as relating to a step of the innovation;
    arranging the order of the flagged parts of the digital audio file to correspond to the sequential order of the steps of the innovation;
    identifying the semantic content of each part of the digital audio file; and
    storing the identified semantic content in an innovation storage platform.

11. The computer implemented method of claim 10, wherein the voice discussion comprises voice signals from a plurality of users.

12. The computer implemented method of claim 10, further comprising determining, from the digital audio file, one of a title of the innovation, a summary of the innovation, a description of the innovation, or a combination thereof.

13. The computer implemented method of claim 10, further comprising identifying with conversation identification circuitry parts of the digital audio file, each part of the digital audio file relating to a separate conversation between a different combination of speakers.

14. The computer implemented of claim 10, further comprising:
    determining a participant voice corresponding to a speaker from the digital audio file;
    comparing the participant voice with user profiles included in the user database;
    selecting from the user profiles a selected user profile that corresponds to a user and includes a voice profile matching the participant voice;
    identifying the session ideas attributed to the participant voice; and
    tagging the session ideas to the speaker.

15. The computer implemented method of claim 14, further comprising:
    generating with session file generation circuitry a session file to include the session ideas tagged to the speaker;
    obtaining, from an external source, supporting information to the session ideas;
    including, as metadata to the session file, both the session ideas and the supporting information;
    uploading the session file to a server portal;
    receiving, from the server portal, a session summary report; and
    presenting the session summary report.

16. The computer implemented method of claim 15, wherein obtaining the supporting information comprises searching the external source for the supporting information while the microphone circuitry records and generates the digital audio file.

* * * * *